April 16, 1963   F. T. JAKEWAYS   3,085,663
AUTOMATIC ADJUSTING DEVICE FOR DISC BRAKES
Filed Oct. 27, 1961
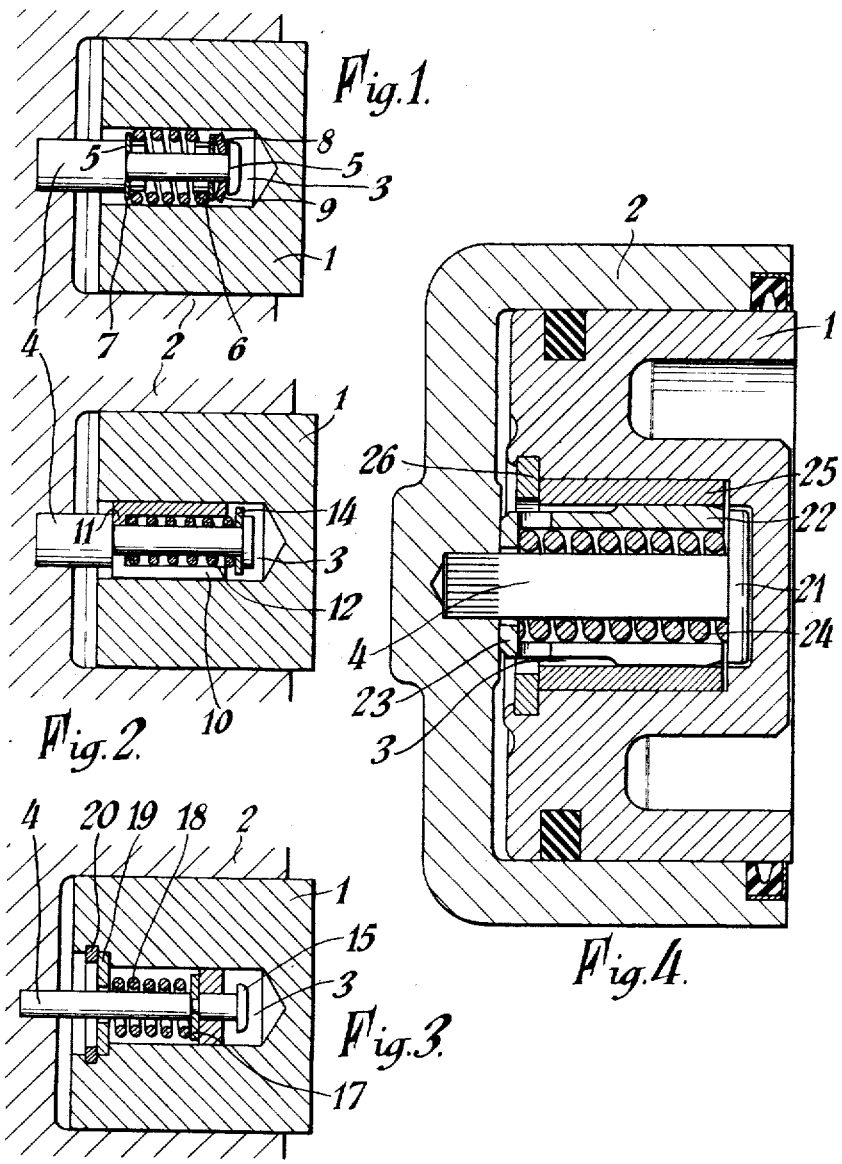
INVENTOR
FREDERICK THOMAS JAKEWAYS
BY Lawrence J. Winter
ATTORNEY United States Patent Office 3,085,663
Patented Apr. 16, 1963

3,085,663
AUTOMATIC ADJUSTING DEVICE FOR
DISC BRAKES
Frederick Thomas Jakeways, Leamington Spa, England, assignor to Automotive Products Company Limited, Leamington Spa, England
Filed Oct. 27, 1961, Ser. No. 148,266
Claims priority, application Great Britain Nov. 2, 1960
8 Claims. (Cl. 188—196)

This invention relates to a device for automatically adjusting the position of telescopic members relative to one another so that upon release of the force acting on said members to effect a working stroke a substantially constant clearance can be maintained between one or the other of said members and a member actuated thereby.

According to the present invention in an automatic adjusting device for telescopic members an intermediate member is interposed between the actuated member or a member moving therewith and a fixed member, said intermediate member being movable axially relative to both of them to and from a retracted position and frictionally engaged with the actuated member or member moving therewith and having its axial movement relative to the fixed member in both directions limited by stops, resilient means acting on the intermediate member to urge it against one of said stops limiting its axial movement to the retracted position.

The automatic adjusting device of the present invention is particularly suitable for incorporation in the fluid pressure operated cylinder of a fluid pressure operated braking system, the device operating to adjust the position of the piston in the cylinder to compensate for wear of for example, the brake pads in a disc brake or the brake linings of a shoe brake. The device may also be adapted for incorporation in mechanically operated brake actuating means.

For example in disc brakes of the kind in which pads of friction material are pressed against opposite faces of a brake disc to provide frictional resistance to its rotation, the pads, or members moving with them, being urged away from the faces of the brake disc by resilient means to establish between the said pads and the brake disc a clearance which is maintained substantially constant despite wear of the pads, it has previously been proposed to provide automatic adjusting devices of this kind in which the pads or members moving with them are urged by the resilient means against stop members which are in frictional engagement with fixed pins, the said pads or members moving with them being permitted a small degree of axial movement relative to the stop members, or in which friction members moving with the said pads or members moving with them engage with pins having a small degree of axial movement relative to a fixed support and urged in a direction to separate the pads from the brake disc by spring means.

According to the present invention however, in an automatic adjusting device for disc brakes an intermediate member interposed between each pad or the member moving therewith and a fixed member is movable relative to both of them in a direction towards and away from the brake disc, the said intermediate member being frictionally engaged with the pad or member moving therewith and having its movement relative to the fixed member in both directions limited by stops, the resilient means acting on the intermediate member to urge it against the stop limiting movement away from the disc.

In for example pressure fluid operated disc brake actuating means in which the pads are moved towards the brake disc by liquid pressure acting in a cylinder or cylinders, the automatic adjusting device is conveniently arranged to control the retracted position of a piston slidable in the said cylinder and acting on a pad. The piston is preferably formed with a co-axial cylindrical cavity extending into the piston from the rear face, a pin is fixed in the cylinder extending into the said cavity co-axially therewith, and the intermediate member, which is in frictional engagement with the cavity wall, is freely movable between stops on the pin.

Embodiments of the invention will now be described by way of example by aid of the accompanying drawings each embodiment showing the automatic adjusting device incorporated in pressure fluid operated brake actuating means for disc brakes. In the drawings:

FIGURES 1, 2 and 3 are diagrammatic views, partly in section showing three different embodiments of automatic adjusting devices;

FIGURE 4 is a view in section showing an automatic adjusting device according to a further embodiment of the invention.

In each of the embodiments shown in the accompanying drawings the pressure fluid brake actuating means comprises telescopic members consisting of a piston 1 slidably mounted in a cylinder 2 which in the brake assembly is disposed on one side of the brake disc not shown, with the piston facing the brake disc, a brake pad constituting a member to be actuated and also not shown, being interposed between the outer end of the piston and the opposite face of the brake disc. The cylinder is closed at its end remote from the brake disc, and is provided with connections for connecting the cylinder to a source of liquid pressure such as the master cylinder of a fluid pressure braking system. Each piston is formed with a co-axial cylindrical recess 3 extending from its rear face, into which extends a fixed pin 4 projecting from the end wall of the cylinder.

In the embodiment of the invention according to FIGURE 1 of the drawings, the pin 4 is reduced in diameter over a portion of its length within the recess in the piston, flat shoulders 5 being provided at each end of the reduced portion. An intermediate member provided by a close-coiled helical spring 6 in frictional engagement with the peripheral wall of the recess 3, engages at one end with a flat washer 7 resting against the shoulder 5 at the end of the reduced portion nearer the closed end of the cylinder, the other end of the spring engaging a second washer 8. A dished disc-type spring washer 9 is interposed between the said second washer 8 and the other shoulder 5 on the pin, the said disc-type spring washer 9 tending to urge the spring 6 towards the closed end of the cylinder.

The frictional grip of the intermediate member provided by the spring 6 on the piston 1 is such that liquid pressure acting on the piston can deform the disc-type spring washer 9 to a flat condition, but the piston can be caused to slide relative to the intermediate member 6 by the liquid pressure.

Thus, during each application of the brake, the piston 1 moves outwardly, the spring 6 moving with it, until the disc-type spring washer 9 is flattened. If further movement is required to bring the pad firmly into engagement with the brake disc, the piston 1 moves relatively to the spring 6, and when the brake is subsequently released, the disc-type spring washer 9 returns the intermediate member inwardly until it re-engages the washer 7 nearer to the closed end of the cylinder. Thus the return movement of the piston 1 is constant, the said piston moving outwardly relative to the spring 6 as the brake pad wears.

In the embodiment shown in FIGURE 2 of the drawings, the pin 4 has a portion of reduced diameter as in the first described embodiment but the intermediate member is in the form of a split sleeve 10 having an internal flange 11 at its end nearer to the closed end of the cylinder 2, the sleeve 10 being urged towards the closed end of the cylinder by a coiled compression spring 12 acting between the said flange and the shoulder 5 at the other end of the pin 4. A washer 14 resting on the said other shoulder 5 serves to limit the axial movement of the split sleeve 10 relative to the pin.

In the embodiment of the invention shown in FIGURE 3 of the accompanying drawings, the pin 4 has a parallel shank and an enlarged head 15 at its outer end. The intermediate member comprises an annular block 16 of friction material in frictional contact with the wall of the recess and movable between the head 15 on the end of the pin 4 remote from the closed end of the cylinder and an intermediate stop provided by a resilient ring 17 engaging in a groove in the pin shank. The piston 1 is urged towards the closed end of the cylinder 2 by a coiled compression spring 18 surrounding the pin between the resilient ring 17 and a washer 19 retained against a shoulder provided by a further resilient ring 20 at the mouth of the recess 3 in the piston 1.

The intermediate member formed by the annular block 16 has a limited range of free movement between the head 15 on the pin 4 and the intermediate stop resilient ring 17, so that it moves with the piston 1 for an equivalent distance, and slides in the recess if the piston movement exceeds that distance, limiting the return movement of the piston to effect adjustment as the pad wears.

In the particular construction according to the further embodiment shown in FIGURE 4 of the accompanying drawings, the pin 4 has a plain shank and is provided at its outer end with an enlarged head 21. A split sleeve 22 surrounds the shank of the pin and has an internal flange 23 at its end adjacent the cylinder 2 the end of the split sleeve being urged into contact with the opposite closed end of the cylinder by a compression spring 24 disposed between the pin shank and the split sleeve the said spring acting between the enlarged head 21 and the internal flange 23 of the split sleeve. A bush 25 is disposed between the periphery of the split sleeve and the bore of the cylindrical recess 3 in the piston 1. The end of the bush 25 adjacent the mouth of the cylindrical recess bears against a stop provided by a resilient retaining ring 26 located in an annular groove in the piston. The axial length of both the bush and the split sleeve is such as to provide a small clearance between the ends of these members and the opposite faces of the closed end of the cylindrical recess and the enlarged head of the pin 4 respectively.

The frictional grip between the bush 25 and the split sleeve 22 is such that liquid pressure acting on the piston can cause initially joint axial movement of the piston bush and split sleeve against the action of compression spring 24, the bush and piston moving relative to the split sleeve when the latter abuts the enlarged head 21 of pin 4.

Thus, during a braking operation, upon the admission of pressure liquid to the cylinder 2 the piston 1 moves outwardly, initially jointly with the bush 25 and split sleeve 22, the compression spring being compressed. If due to pad wear further outward movement is required to bring the pad firmly into contact with the brake disc after the split sleeve has contacted the enlarged head of the pin 4, the piston 1 and bush 25 will continue to move relative to the split sleeve 22. When the brake is released by releasing the pressure in the cylinder 2, the compression spring will return the split sleeve 22 to its retracted position.

It will be understood that the adjusting device may act directly on a backing member forming part of a brake pad, and that as previously stated, the brake may be operated mechanically in addition to or by fluid pressure.

I claim:

1. An automatic adjusting device for a brake comprising a housing having a cylinder therein with one end of said cylinder being open, a fluid operated piston disposed in said cylinder for movement through the open end of said cylinder, said piston being closed across its diameter adjacent said open end, a cylindrical axially extending recess in said piston opening into said cylinder and disposed opposite the closed end of the piston, an axially extending pin fixed at one end to said housing and having its other end extending into said axial recess, friction means completely enclosed within said axial recess and encircling said pin and in frictional engagement with the circumference of said axial recess, said friction means being movable axially relative to said pin and piston, and biasing means mounted on said pin and completely enclosed within said axial recess for normally urging said friction means in an axial direction away from the open end of said cylinder.

2. The device of claim 1 wherein said friction means is a helical coil spring.

3. The device of claim 1 wherein said biasing means is a dished disc type spring washer.

4. The device of claim 1 wherein said friction means is a split sleeve.

5. The device of claim 1 wherein said pin has axially spaced stop means thereon and said friction means is disposed for limited axial movement between said stop means.

6. The device of claim 1 wherein said pin has an enlarged end thereon adjacent the end thereof within said recess which provides a stop to limit axial movement of said friction means.

7. The device of claim 6 wherein another stop is provided on said pin adjacent the portion thereof fixed to said housing.

8. The device of claim 1 wherein said friction means is an annular block member made of friction material.

References Cited in the file of this patent

UNITED STATES PATENTS

| 2,160,055 | Brace | May 30, 1939 |
| 2,531,341 | Meador | Nov. 21, 1950 |
| 2,746,254 | Lucien | May 22, 1956 |
| 2,905,277 | Cagle | Sept. 22, 1959 |

FOREIGN PATENTS

| 200,718 | Australia | Jan. 25, 1956 |
| 804,826 | Great Britain | Nov. 26, 1958 |

Notice of Adverse Decision in Interference

In Interference No. 93,933 involving Patent No. 3,085,663, F. T. Jakeways, AUTOMATIC ADJUSTING DEVICE FOR DISC BRAKES, final judgment adverse to the patentee was rendered Feb. 18, 1965, as to claims 3 and 4.

[*Official Gazette May 4, 1965.*]